US008050448B2

(12) United States Patent
Ritter et al.

(10) Patent No.: US 8,050,448 B2
(45) Date of Patent: Nov. 1, 2011

(54) MEHTOD AND SYSTEM FOR ACHIEVING ACCESS TO AN OBJECT OR A SERVICE

(75) Inventors: Rudolf Ritter, Zollikofen (CH); Eric Lauper, Bern (CH)

(73) Assignee: Swisscom AG, Bern (CH)

( * ) Notice: Subject to any disclaimer, the term of this patent is extended or adjusted under 35 U.S.C. 154(b) by 1145 days.

(21) Appl. No.: 11/775,947

(22) Filed: Jul. 11, 2007

(65) Prior Publication Data

US 2007/0248242 A1 Oct. 25, 2007

Related U.S. Application Data

(63) Continuation of application No. PCT/EP2005/057234, filed on Dec. 30, 2005.

(30) Foreign Application Priority Data

Jan. 11, 2005 (EP) .................................... 05100107

(51) Int. Cl.
*G06K 9/00* (2006.01)

(52) U.S. Cl. ....................................... 382/100; 382/115

(58) Field of Classification Search .................. 382/100, 382/115; 235/379, 380; 705/5
See application file for complete search history.

(56) References Cited

U.S. PATENT DOCUMENTS

| | | | | |
|---|---|---|---|---|
| 6,045,039 | A * | 4/2000 | Stinson et al. | 235/379 |
| 6,119,096 | A * | 9/2000 | Mann et al. | 705/5 |
| 6,657,538 | B1 * | 12/2003 | Ritter | 340/5.81 |
| 7,127,232 | B2 * | 10/2006 | O'Neil et al. | 455/408 |
| 7,761,463 | B2 * | 7/2010 | Wheeler | 707/769 |
| 2002/0089410 | A1 * | 7/2002 | Janiak et al. | 340/5.53 |

FOREIGN PATENT DOCUMENTS

| | | | |
|---|---|---|---|
| DE | 100 56 662 | A1 | 12/2001 |
| DE | 101 33 647 | A1 | 12/2002 |
| JP | 2003274007 | A | 9/2003 |
| JP | 2004013753 | A | 1/2004 |
| JP | 2004318598 | A | 11/2004 |

OTHER PUBLICATIONS

International Search Report for PCT/EP2005/057234.
Official action for Japanese Patent Application No. 2007-549852, dated Apr. 19, 2011.

* cited by examiner

*Primary Examiner* — Stephen Koziol
(74) *Attorney, Agent, or Firm* — Pearne & Gordon LLP

(57) ABSTRACT

A method is disclosed for gaining access to an object and/or to a service of an object or service provider. A biometric reference parameter of at least one user is recorded in a personal mobile station. The user orders an object or service from a remote server by means of his personal mobile station. An actual biometric parameter is recorded by a biometric sensor of the object or service provider and the recorded actual biometric parameter is compared to the reference parameter. On a successful comparison, access to the object or service is permitted. The invention further relates to a system with the components mentioned.

27 Claims, 1 Drawing Sheet

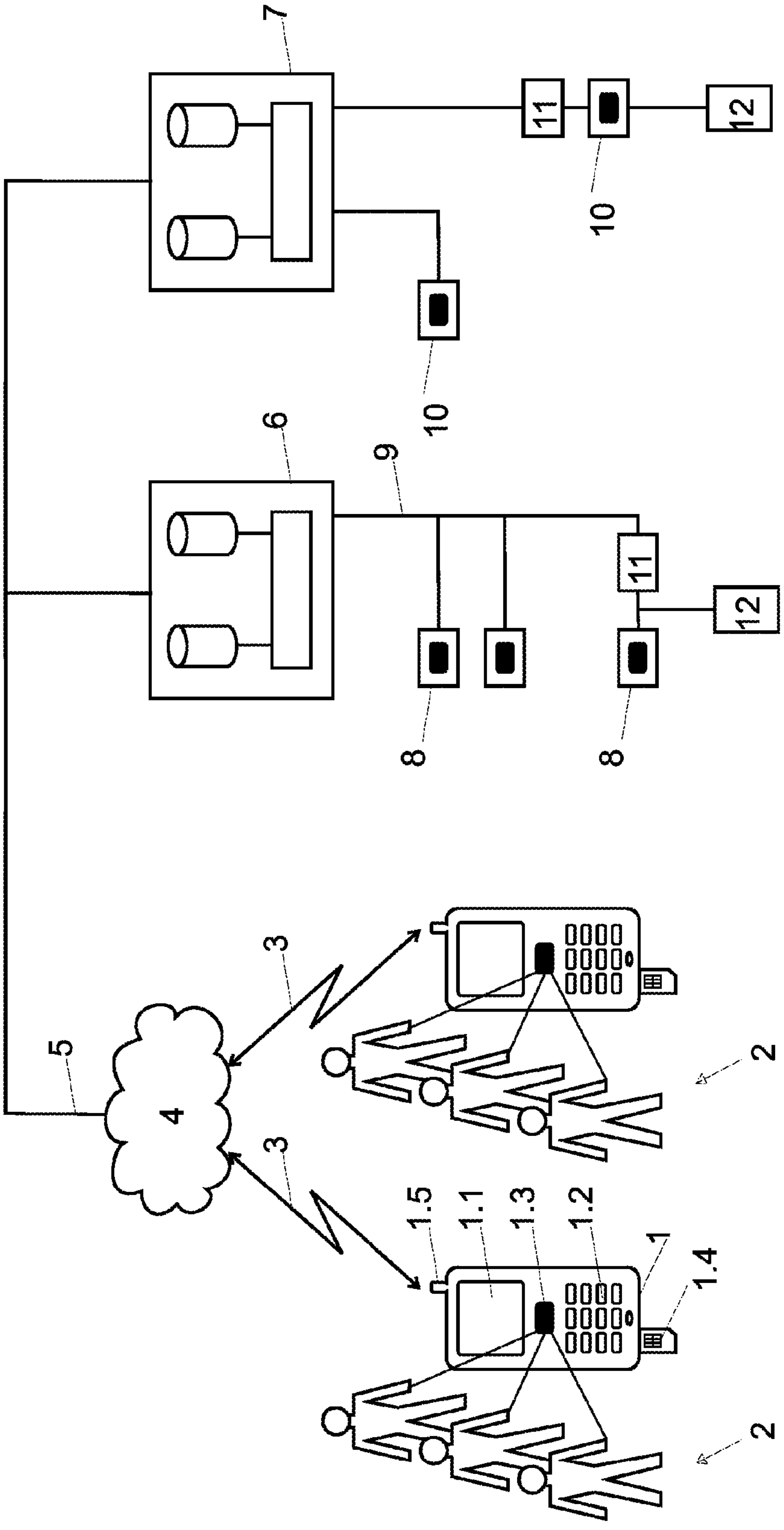
Fig.

MEHTOD AND SYSTEM FOR ACHIEVING ACCESS TO AN OBJECT OR A SERVICE

REFERENCE DATA

This application is a continuation of international PCT patent application 2005WO-EP057234 (WO06074864) filed on Dec. 30, 2005, claiming priority from European patent application 2005EP-100107 (EP1679665) of Jan. 11, 2005, the contents whereof are hereby incorporated by reference.

TECHNICAL FIELD

The invention relates according to the independent claims to a method and to a system for gaining access to an object or to a service.

BACKGROUND OF THE INVENTION

Numerous biometric access control installations are known from the prior art. EP-A2-1347420 discloses for example a control when entering a stadium, where the user has to have his fingerprint taken. The scanner is connected over a stadium computer with a national central computer and establishes within less than half a second that the user is a perfectly normal spectator. A revolving stake door is opened and the spectator can proceed. If a reference fingerprint corresponding to the taken fingerprint is however recorded in the computer, the user is a rioter or a ruffian. Instead of the revolving stake door, a side revolving door is opened and the undesired visitor is invited to leave. It is also conceivable that the reference fingerprint is stored on a chip card that the user has to carry. The card is inserted in the device and the comparison is performed locally.

US publication US-A1-2003/0197593 discloses a system in which access control and identification, for example for employees of a company, take place on the basis of recorded biometric data. The reference data are stored in a central database. In one embodiment, the biometric data of a user are taken and the central database is interrogated. In the case of positive identification, access is granted. The central data storage of the biometric data in this embodiment is less advantageous. It is questionable whether data security is guaranteed since hackers can penetrate a central computer or server and misuse is thus possible. Furthermore, data protection problems arise in the case of permanent storage of the biometric data.

On the other hand, many mobile devices are already provided with a biometric sensor. US-A1-2002/0089410 discloses a PDA with a smart card on which a fingerprint of the user is stored and that is connected to a fingerprint module. If the print taken by the sensor corresponds to the stored print, further functions (access to software etc.) are executed.

U.S. Pat. No. 6,119,096 further discloses a system in which airline passengers are recorded biometrically when booking the flight. The iris is scanned when booking and the recorded data is assigned to a person-bound data set of a common central database. The passenger receives his booking number for the desired flight, seat etc. At the airport, no further controls are provided to identify the passenger. He only needs to be identified biometrically by scanning the iris and can board his flight. It is again questionable whether sufficient data security of these sensitive data can be provided by a central storage of the biometric data. The mentioned data protection problems of permanent storage of the biometric data also apply here.

Publication DE-A1-101 33 647 concerns a method where a user connects with a (money or ticket) machine and is authenticated biometrically in order to access a service. In one variant embodiment, the fingerprints are stored in a database of a bank and a customer wishing to withdraw money at a machine is authenticated in front of the machine through comparison with the stored data. In particular, there is no disclosure of a service being ordered with a mobile device from a service provider and the service is always immediately provided at the machine.

REPRESENTATION OF THE INVENTION

It is an aim of the present invention to propose a method and a system with which a user can make a reservation with his own mobile device without greater effort in order to gain access to an object or to a service. The personal or group-bound access should thus be without problem for a certain period of time.

According to the invention, the task is solved with a method that has the following method steps:

(a) a biometric reference parameter of at least one user is stored in a personal mobile station, and (b) the user orders an object or a service from a remote server over a communication network with his personal mobile station, (c) an actual biometric parameter is recorded by a biometric sensor of the object or service provider and the recorded actual biometric parameter is compared with the reference parameter, and (d) in the case of a successful comparison, access to the object or service is authorized.

According to the invention, said task is also solved through a system with the characteristics of the independent device claim.

The inventive method gives the possibility of gaining access authorization to an object or a service. As a service, it is possible for example to book a hotel room, a holiday flat or another resource in a building for a specific period of time, or to reserve a ticket for a concert, an exhibition or another event (a disco, gala, cinema etc.). The present method is also advantageously suited for borrowing or pre-ordering other objects (renting a bicycle, buying special pre-ordered products, booking travel tickets etc.).

Advantageously, it is possible with the invention to allow access to the object or service only for period of time predetermined by the service provider or by the user.

In a first embodiment of the invention, a biometric reference parameter (or key data of the user derived therefrom, a so-called template) is transmitted to the remote server during the ordering procedure. During access control to the object, the actual biometric parameter is recorded by a sensor of the object or service provider and compared with the biometric reference parameter by a comparison module. The comparison module can be implemented in the remote server or in the biometric sensor of the object or service provider to which the corresponding biometric parameters are transmitted. The comparison of the biometric parameters can thus be performed without problem on location, before access to the object is granted. The advantage is that the authorized person can, without a personal mobile station, access the objects or services he ordered.

In the frame of the invention, general communication networks are conceivable, mobile networks such as GSM, GPRS, EDGE, WLAN or UMTS as well as Internet or other fixed networks, as well as connections according to the UMA concept (UMA is the acronym for Unlicensed Mobile Access, for example Bluetooth or systems according to the standard 802.11x, see umatechnology.org). In this connection, there is a range of transmission possibilities such as SMS, MMS, USSD, E-mail, web or WAP page etc.

The booking can be made with a special software (applet) that is offered by the service provider and downloaded on the mobile station. Encryption of the data is performed by the identification module (SIM card) of the mobile station or by the software, or at least the keys for symmetrical or asymmetrical encryption can be stored in the SIM card or in the mobile device. In order to advantageously simplify the method, the biometric data are stored in a memory of the mobile device or a SIM card in the mobile device, and is accessed by the software during a booking.

The method is advantageously suited also for groups (family, work colleagues, sports club), with individual access rights being granted to each group member. The main user can define in his mobile station such a group, store the biometric data of all the members of this group and make a single booking. The advantage is that the other authorized persons can access, without personal mobile station, the reserved objects or services.

In an advantageous variant embodiment of the inventive method, different access rights to different objects or services can be allocated to different fingers of the user in the inventive method. For security reasons, at the end of the duration of use of the object or the duration of the service, the biometric parameter or the key data of the user derived therefrom can be deleted from the remote server, so that no misuse can occur with the biometric data and no problems with data protection right can arise.

In an advantageous variant embodiment of the inventive method, several fingers or other biometric identification features can be recorded sequentially. The advantage is that the error rate for wrong biometric parameters being considered correct will be drastically reduced.

In a second embodiment of the invention, the biometric reference parameter (or key data of the user derived therefrom, so-called templates) and additionally a further person-bound code are transmitted to the remote server during the ordering procedure. During access control to the object, the actual biometric parameter is recorded by a sensor of the object or service provider and the person-bound code is entered by an input device, and compared with the corresponding reference indications by a comparison module. The comparison module can be implemented in the remote server or in the biometric sensor of the object or service provider where the corresponding biometric parameters are transmitted. The comparison of the biometric parameters can thus be performed without problem on location, before access to the object is granted. The advantage is that the authorized person can, without a personal mobile station, access the objects or services he ordered. If the person-bound code is unique for each user, the biometric parameter can be used for verification. It is thus possible to avoid that biometric parameters of unauthorized persons are accepted by inaccurate sensors.

The inventive method and system allow an easy, person-bound booking that can be performed with a high level of security. A central, permanent storage of the biometric data is advantageously not provided.

BRIEF DESCRIPTION OF THE FIGURES

The invention will be described in more detail on the basis of the single FIGURE that shows an inventive system with which the method of the invention can be performed. Only the elements essential for understanding the invention are represented.

WAYS OF EXECUTING THE INVENTION

The single FIGURE shows an inventive system that is suitable for executing the present invention. This is a method for gaining access authorization to an object or a service. As a service, it is possible for example to book a hotel room, a holiday flat or another resource in a building for a specific period of time, or to reserve a ticket for a concert, an exhibition or another event (a disco, gala, cinema etc.). The present method is also advantageously suited for borrowing or pre-ordering other objects (renting a bicycle, buying special pre-ordered products, booking travel tickets etc.).

A user is provided with a personal mobile device 1. As mobile device 1 or mobile station, a range of devices are suitable: a mobile telephone, a portable computer, a PDA or a networked game console. The mobile device 1 is provided with a display 1.1 and a keyboard 1.2. simultaneously, a biometric sensor 1.3 is integrated, with which a biometric parameter of the user can be recorded. It is obvious that input means of the mobile device 1 (keyboard, mouse etc.) can also be provided with such a sensor 1.3 or act as such a sensor 1.3. It is conceivable within the frame of the invention that the mobile device 1 connects with such a module over a wireless interface at close range (lrDA, Bluetooth, ZigBee, etc.). An additional module that is connected with the mobile device 1 over a wired interface (for example a USB interface) is possible within the frame of the invention.

In the embodiment represented in the single FIGURE, the mobile station is a mobile telephone that has a SIM card as identification module 1.4 and a mobile antenna 1.5 and that is connected within a mobile radio network 4. In the frame of the invention, general communication networks are conceivable, mobile networks such as GSM, GPRS, EDGE, WLAN or UMTS as well as Internet or other fixed networks, as well as connections according to the UMA concept (UMA is the acronym for Unlicensed Mobile Access, for example Bluetooth or systems according to the standard 802.11x, see umatechnology.org).

According to a first embodiment of the present invention, a user wishing to gain access to an above mentioned object or to a service will have his biometric data (reference parameters) recorded by the biometric sensor 1.3 of the mobile device 1 and transmitted over a communication network to a remote server 6, 7. The remote server 6, 7 is operated by a provider of the object or of the service or by another administrator. In the single FIGURE, the transmission occurs for example signed and encrypted over a mobile radio interface 3 and a communication connection 5. The encryption of at least the sensitive biometric data of the user further increases the data security of the inventive method and protects against misuse of the transmitted data. Instead of transmitting the original biometric reference parameters to the remote server 6, 7, which could meet with poor user acceptance, a derived form, a so-called template or signature can be computed and transmitted. The same algorithm must then be used for recording the biometric reference parameter in the mobile station and for recording in the biometric sensor 8, 10 of the object or service provider.

In an advantageous embodiment of the invention, the provider of the object or of the service or another producer offers a software program that the user downloads onto his mobile device 1 and with which he carries out the order and/or which performs the encryption of the biometric data or also of other transmitted data (booking details, personal data, person-bound code etc.). The encryption could also be performed by the SIM card of the mobile station. The program can be installed merely temporarily as applet on the mobile device 1 when the object or service is reserved. The biometric reference parameters could also be stored on the previously mentioned SIM card of the mobile device 1 or in another memory of the mobile device 1 and retrieved from there. The downloaded software program can then advantageously access the stored data without the user having to generate each time the biometric data anew.

An easy biometric record can be made with a fingerprint sensor as biometric sensor 1.3. Other biometric data such as face, retina or iris recognition, voice analysis, pulse recording, body current recording etc. are conceivable in the frame of the invention and can be recorded by means of a camera or sensor integrated in the mobile device. For voice recognition, the mentioned biometric sensor 1.3 will be a microphone. In order to derive therefrom key data of the user, such as a univocal code, an alphanumeric sequence etc., a corresponding software is installed in the mobile device 1 that is tailored to the biometric sensor 1.3 and that further processes the recorded data.

During the event etc., the biometric reference parameter is transmitted by the remote server 6 to a comparison module 11 connected with the biometric sensor 8 of the object or service provider, or the actual biometric parameter of the user, recorded by the biometric sensor 8, is transmitted to the remote server 6. The comparison of the biometric parameters (reference with actual) can thus be performed without problem on location before access to the object is granted.

In one embodiment, the remote server 6 is connected to a hotel management system. The user sends his booking details such as date of arrival and departure, number and selection of rooms, number of meals etc., which he enters into the applet, together with the biometric data from his personal mobile device 1 to the remote server 6. Simultaneously, personal data such as name, address, billing particulars etc. can also be transmitted if they are not yet available in the remote server 6. The remote server 6, after receiving the message and corresponding booking, sends a confirmation message to the personal mobile device 1, including for example the room number or the seat number or other particulars. On the basis of the above mentioned communication networks, a plurality of messages are possible for booking and confirmation: SMS, MMS, USSD, E-mail, web or WAP page etc. can be used without problem.

For the duration of use of the hotel room or of the holiday flat, the biometric reference parameter or the key data of the user derived therefrom from the remote server 6 are connected logically with a biometric sensor 8. The biometric sensor 8 is located at the hotel room door or at the door of the holiday flat. Different biometric sensors 8 can of course be available on different doors that lead to the same or to different objects. The user can thus, additionally to access to his room, reserve simultaneously access to a fitness room, to a sauna or to an underground car park. The user can thus be authenticated at the biometric sensor 8 by having the actual biometric parameter recorded and compared with the data stored in the remote server 6, and gain access to the object or service. The biometric sensor 8 is to this effect connected with a module 11 for comparing the stored biometric reference parameters and the recorded actual parameters. Simultaneously, the biometric sensor 8 is connected with means 12 that control access to the room door (or to another object). Advantageously, the user no longer needs to register at reception, since all data of the user are already available in the remote server 6 of the hotel management and the user has already received from the remote server 6 the room number, day of arrival, time of the breakfast buffet etc. in the confirmation message. It is important in this connection to note that the biometric reference parameter and the actual biometric parameter are recorded by two different sensors.

If a holiday flat is booked for the whole family with the same system, the user could define in his mobile device 1 a group 2 and store the biometric reference parameters of all the family members in this group 2. When reserving, the biometric data of the group 2 are transmitted to the remote server 6. During the holidays, the data of all family members are stored in said remote server 6. Each family member thus gains an individual access authorization for the holiday flat, without having to separately request a key or register at reception. The user is responsible in this case for the billing for the entire group 2, his family, his work colleagues, etc. that are members of the group 2 vis-à-vis the hotel or the landlord of the holiday flat.

According to the same principle, a sequence of fingerprints or other biometric identification features can be recorded as biometric parameters. If the error rate for wrongful acceptance of a non-authorized finger is $10^5$, this error rate will drop to $10^{10}$ for a sequence of two fingers or other features.

In the second example, which is represented in the single FIGURE, a remote server 7 is part of a concert organizer or of an organization that sells tickets for concerts, gala events, movie performances. Again, in order to make a reservation, the user sends in encrypted form through his personal mobile device 1 to the remote server 7 a message with all booking details, concert, name of the group 2, cinema film etc. together with his personal biometric reference parameters. The remote server 7 stores the data and sends, in the described way, a confirmation message to the user. On the day of the concert, the personal data (biometric reference parameters) of the user are connected by the remote server 7 over a local connection 9 or another communication connection with the biometric sensors 10 and stored in a comparison module 11. It is also conceivable that the recorded actual biometric parameters are sent by the biometric sensor 11 to the remote server 7. The sensors 10 are placed at the entrance of the cinema or concert hall. The visitor at the event is authenticated at the entrance at the biometric sensor 10 by recording the biometric parameter and comparing it with the stored data, and thus gains access to the event he booked. Together with entering a single code such as for example a seat number during entry of the actual biometric parameter will merely allow the identity of the authorized person to be verified. This makes the complexity of the verification much easier.

In an advantageous embodiment of the inventive method, different access rights to different objects or services can be allocated to different fingers of the user in the inventive method. For security reasons, at the end of the duration of use of the object or the duration of the service, the biometric parameter or the key data of the user derived therefrom can be deleted from the remote server, so that no misuse can occur with the biometric data.

In a second embodiment of the invention, during the ordering procedure, a further person-bound code is transmitted together with the details of the order to the remote server 6, 7. This could be the telephone number or another code that is stored in the mobile station. Before the event etc, the user goes to the location of the event and is authenticated at a biometric sensor 8, 10 that is placed on the object or at the service and is connected with the means 12 controlling access. The biometric reference parameter stored in the mobile station is transmitted over a contactless interface at close range (Bluetooth, lrDA, ZigBee etc.) by the mobile station to a comparison module 11 connected with the biometric sensor. The biometric sensor takes the actual biometric parameter of the user and the actual parameter is then compared with the biometric reference parameter in the comparison module 11. Additionally, the person-bound code that was stored during the ordering procedure is transmitted by the server 6, 7 to the comparison module 11 connected with the biometric sensor or by the comparison module 11 to the remote server 6, 7. The comparison of the biometric reference parameter and the person-bound code can also be performed without problem on location before access to the object is granted.

In a similar way, it is also possible to order things. If a user wishes, with his family, to rent bicycles, he reserves the bicycles in advance in the manner described here and is identified at a biometric sensor in a shop or gains access to the objects that are placed in a particular, closed-off place (bicycle shed, garage, etc.). The garage is also closed with a biometric sensor. The inventive method also makes it possible to reserve other objects. The user can reserve a travel ticket and instead of queuing for a long time at a ticket booth, he can be authenticated at an automatic machine and the ticket is printed by the machine. This can occur without waste of time directly before the train leaves. In the same manner, it is also possible to control a ski lift, where the ski ticket is ordered electronically in advance in the described manner and the authentication is done before boarding. A turnstile or another access restriction to the lift is only then released if the biometric authentication of the user is positive.

The temporary access to the object or service can be billed over the telephone bill, over a prepaid account or over a credit card of the user. The user could open an account with the ticket agent's or the hotel over the Internet or the mobile telephone and indicate the billing mode for this account (credit card, prepaid, monthly bill etc.). He can gain an overview over made and expired reservations or incurred costs at any time by logging into this account. When the user transmits the reservation to the organizer or service provider, the user's account in this case is also simultaneously debited in the manner predetermined by him. The billing could of course also take place over the telephone bill of a mobile telephone subscriber. In this case, the costs are collected by the telephone company and forwarded to the organizer or provider of a service.

The present invention also relates to a system for gaining access to an object or to a service, with the device characteristics indicated in the description. The inventive method and system allows a simple, person-bound reservation that can be performed with a high data security. A central, permanent storing of the biometric data is advantageously not provided.

LIST OF REFERENCES

1 Mobile device
1.1 Display
1.2 Keyboard
1.3 Biometric sensor
1.4 Identification module
1.5 Mobile antenna
2 Group
3 Mobile radio interface
4 Mobile radio network
5 Communication connection
6 Remote server
7 Remote server
8 Biometric sensor
9 Local connection
10 Biometric sensor
11 Comparison module
12 Means for controlling access to the object or service

The invention claimed is:

1. Method for gaining access to an object of an object provider or a service of a service provider, with the following method steps:

(a) a biometric reference parameter of at least one user is stored in a personal mobile station, and (b) the user orders or reserves for a later time or a later time frame an object or a service from a remote server over a communication network with the personal mobile station, wherein the biometric reference parameter or a personal code stored in the personal mobile station is transmitted to the remote server, (c) an actual biometric parameter is recorded by a biometric sensor of the object or service provider and the recorded actual biometric parameter is compared with the reference parameter, and (d) in the case of a successful comparison, access to the object or service for the later time or the later time frame, for which the object or the service was ordered or reserved, is authorized.

2. The method of claim 1, wherein to increase security, a plurality of biometric parameters are recorded sequentially by a user and compared with biometric reference parameters.

3. The method of claim 1, wherein access to the object or service is allowed only for a specific period of time predetermined by the service provider or by the user.

4. The method of claim 1, wherein the biometric reference parameter is transmitted by the remote server to a comparison module connected with the biometric sensor of the object or service provider or the actual biometric parameter is transmitted by the biometric sensor to the remote server.

5. The method of claim 1, wherein after the duration of use of the object or the duration of the service ends, the biometric reference parameter of the user is deleted from said remote server.

6. The method of claim 1, wherein the biometric parameters of a plurality of users that build a group are transmitted by the personal mobile station and stored in said remote server and the individual members of the group can be authenticated individually and gain access to the object or to the service.

7. The method of claim 1, wherein the actual biometric is recorded by the biometric sensor of the object or service provider together with a single code.

8. The method of claim 1, wherein the biometric reference parameter and additionally a further person-bound code are transmitted over a contactless interface at close range by the mobile station to a comparison module connected with the biometric sensor, where the person-bound code has been transmitted to the remote server during the ordering procedure.

9. The method of claim 8, wherein the person-bound code is transmitted to the comparison module connected with the biometric sensor or by the comparison module to the remote server.

10. The method of claim 1, wherein the biometric parameter of the user or users is stored in the personal mobile station individually or together as a group.

11. The method of claim 1, wherein the biometric parameter of the user or users is stored in an identification module in the personal mobile station.

12. The method of claim 1, wherein the data transmitted to the remote server are transmitted at least partly encrypted over the communication network.

13. The method of claim 1, wherein software is downloaded on the mobile station for performing the order or ensuring the secured transmission of the data between the personal mobile station and the remote server.

14. The method of claim 13, wherein the downloaded software accesses the biometric reference parameters stored in the mobile station or on the person-bound code of the user or users.

15. The method of claim 1, wherein, as biometric parameter, a fingerprint, the face, the iris or the retina is scanned or the voice of the user or users is recorded.

16. The method of claim 1, wherein with different fingerprints access rights to different objects or services can be linked.

17. The method of claim 1, wherein the order, the biometric parameter or a person-bound code of the user or users are transmitted to the remote server over a mobile radio network such as GSM, GPRS, EDGE, WLAN or UMTS, over the Internet or another fixed network.

18. The method of claim 1, wherein the data are transmitted to the remote server via SMS, MMS, USSD, E-mail, Web or WAP page.

19. The method of claim 1, wherein as mobile station, a mobile telephone, a portable computer, a PDA or a networked game console are used.

20. The method of claim 1, wherein the user, after transmission of the order, receives from the remote server on the personal mobile station a message with a booking confirmation.

21. The method of claim 1, wherein the temporary access to the object or service is billed over the telephone bill, over a prepaid account or over a credit card of the user.

22. The method of claim 1, wherein in the mobile station a biometric sensor is integrated or in that the mobile station is connected with such a sensor.

23. The method of claim 1, wherein the method is used as access control to a hotel room, a holiday flat, a resource in a building, a concert, an event or an exhibition or to order an object.

24. A system for gaining access to an object of an object provider or a service of a service provider, including:

(a) a personal mobile station on which a biometric reference parameter of at least one user is stored, (b) a communication network connected with the personal mobile station, (c) a remote server connected to the communication network, (d) the personal mobile station orders or reserves an object or a service for a later time or a later time frame in the remote server, (e) a biometric sensor of the object or service provider, connected with the remote server, that records an actual biometric parameter of the user, (f) the biometric sensor of the object or service provider being connected with means that control access to the object or service for the later time or the later time frame for which the object or the service was ordered or reserved, and (g) a comparison module connected with the remote server and the biometric sensor which compares the actual biometric parameter with the stored biometric reference parameter.

25. The system of claim 24, wherein the personal mobile station is a mobile telephone, a portable computer, a PDA or a networked game console.

26. The system of claim 24, wherein the system is an access control to a hotel room, a holiday flat, a resource in a building, a concert, an event or an exhibition or to order an object.

27. The system of claim 24, wherein the personal mobile station transmits the biometric reference parameter or a personal code stored in the personal mobile station to the remote server.

* * * * *